(12) United States Patent
Suddreth et al.

(10) Patent No.: US 11,726,340 B1
(45) Date of Patent: Aug. 15, 2023

(54) SYSTEMS AND METHODS FOR TRANSFORMING VIDEO DATA IN AN INDIRECT VISION SYSTEM

(71) Applicant: HONEYWELL INTERNATIONAL INC., Charlotte, NC (US)

(72) Inventors: John Suddreth, Phoenix, AZ (US); Kenneth Leiphon, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/656,672

(22) Filed: Mar. 28, 2022

(51) Int. Cl.
*G02B 27/01* (2006.01)
*G02B 27/00* (2006.01)

(52) U.S. Cl.
CPC ..... *G02B 27/0179* (2013.01); *G02B 27/0093* (2013.01); *G02B 27/017* (2013.01); *G02B 2027/0181* (2013.01); *G02B 2027/0183* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 6,091,334 A * | 7/2000 | Galiana | .......... | G08B 21/06 340/576 |
| 6,497,649 B2 | 12/2002 | Parker et al. | | |
| 7,717,841 B2 | 5/2010 | Brendley et al. | | |
| 9,283,349 B2 | 3/2016 | Yeh | | |
| 10,286,843 B2 * | 5/2019 | Gieseke | .......... | B60R 1/00 |
| 10,546,560 B2 | 1/2020 | Bradley | | |
| 2009/0179987 A1 | 7/2009 | Kim | | |
| 2013/0038732 A1 * | 2/2013 | Waite | .......... | B60R 1/00 348/148 |
| 2013/0096820 A1 * | 4/2013 | Agnew | .......... | B60R 1/00 701/428 |
| 2014/0152792 A1 | 6/2014 | Krueger | | |
| 2014/0336876 A1 * | 11/2014 | Gieseke | .......... | G06F 3/017 345/156 |
| 2016/0093105 A1 * | 3/2016 | Rimon | .......... | G06F 3/013 345/633 |
| 2016/0185293 A1 * | 6/2016 | Gieseke | .......... | G06F 3/013 348/115 |
| 2016/0297362 A1 * | 10/2016 | Tijerina | .......... | H04N 5/23293 |
| 2017/0136842 A1 * | 5/2017 | Anderson | .......... | B60N 2/0244 |
| 2018/0162186 A1 * | 6/2018 | Anderson | .......... | A61B 5/4023 |
| 2018/0284770 A1 * | 10/2018 | VandenBerg, III | .. | G08G 1/0133 |
| 2019/0005412 A1 * | 1/2019 | Matus | .......... | G06Q 30/0201 |

(Continued)

FOREIGN PATENT DOCUMENTS

| CN | 109426345 A | 3/2019 |
|---|---|---|
| JP | 4882433 B2 | 2/2012 |

*Primary Examiner* — Fred Tzeng
(74) *Attorney, Agent, or Firm* — Lorenz & Kopf LLP (57) ABSTRACT

Systems and methods are disclosed that include a video processing system associated with a vehicle. The video processing system receives video data from at least one camera mounted to the vehicle, the video data representing an external scene, receives motion data, a virtual gaze direction of viewing of the external scene and a direction of facing of a head of a user. The video data is transformed based at least on a disparity between the virtual gaze direction and the direction of facing and based on the motion data. The transformed video data is displayed on a display device of the user.

20 Claims, 2 Drawing Sheets

(56) References Cited

U.S. PATENT DOCUMENTS

| | | | |
|---|---|---|---|
| 2019/0263321 A1* | 8/2019 | Gieseke | G06F 3/017 |
| 2020/0109954 A1* | 4/2020 | Li | G05D 1/0278 |
| 2020/0410963 A1 | 12/2020 | Nagata et al. | |
| 2021/0209725 A1* | 7/2021 | Humbert | G06V 20/58 |
| 2021/0387573 A1* | 12/2021 | Hinson | G06T 7/70 |
| 2021/0407225 A1* | 12/2021 | Matus | G06Q 30/0201 |

* cited by examiner

SYSTEMS AND METHODS FOR TRANSFORMING VIDEO DATA IN AN INDIRECT VISION SYSTEM

TECHNICAL FIELD

The present disclosure generally relates to systems and methods for transforming video data in an indirect vision system of a vehicle.

BACKGROUND

An indirect vision system provides a digital display of an external scene to occupants of a vehicle. A camera system is mounted to the vehicle to provide a video feed to an occupant display device for indirect viewing of the external scene. Such an indirect viewing system may have utility in a windowless armored vehicle, for example. Discrepancies between the visual information and the vestibular and proprioceptive (e.g. inertial motion sensed by the inner ear) information about real world motions may occur when an indirect vision system is used. Such discrepancies are known to provoke motion sickness.

The vestibulo-ocular reflex (VOR) is a gaze stabilizing reflex: the sensory signals encoding head movements are transformed into motor commands that generate compensatory eye movements in the opposite direction of the head movement, thus ensuring stable vision. The VOR can create image blurring when there is a mismatch between the motion sensed by the inner ear and the motion of the external scene in the video feed.

Accordingly, it is desirable to provide systems and methods that can lessen motion sickness in indirect vision systems. Additionally, it is desirable to reduce blurring as a result of VOR. Furthermore, other desirable features and characteristics of the present invention will become apparent from the subsequent detailed description and the appended claims, taken in conjunction with the accompanying drawings and the foregoing technical field and background.

SUMMARY

In one aspect, a video processing system is provided. The video processing system is associated with a vehicle. The video processing system includes one or more processors configured to execute program instructions. The program instructions are configured to cause the at least one processor to: receive video data from at least one camera mounted to the vehicle, the video data representing an external scene; receive motion data comprising at least one of vehicle inertial motion data from a vehicle inertial measurement unit and head position and motion data from a head position and motion tracking device; receive a virtual gaze direction of viewing of the external scene; receive a direction of facing of a head of a user from the head position and motion tracking device; transform the video data based at least on a disparity between the virtual gaze direction and the direction of facing and based on the motion data; and display the transformed video data on a display device of the user.

In embodiments, the program instructions are configured to cause the at least one processor to: receive head position and motion data from a head position and motion tracking device mounted to at least one of a headset of the user and the vehicle, and wherein the video data is transformed additionally based at least on a disparity between the vehicle inertial motion data and the head position and motion data.

In embodiments, the direction of facing is at least one of: predetermined information, detected by a head tracking device and determined based on the vehicle inertial motion data and the head position and motion data from the head position and motion tracking device mounted to both the headset of the user and the vehicle.

In embodiments, the virtual gaze direction of viewing the external scene is selectable by a user controller.

In embodiments, transforming the video data comprises transformation, based on the motion data, to cancel or reduce a difference between expected horizon movement as a result of motion experienced in the direction of facing of the head of the user and horizon movement in the video data representing the external scene as a result of the virtual gaze direction of viewing of the external scene.

In embodiments, transforming the video data includes simulating, based on the inertial motion data, a movement of the external scene to correlate with inertial motion in the direction of facing of the head of the user.

In embodiments, transforming the video data includes at least one of pitch, roll and yaw transformations.

In embodiments, transforming the video data includes at least one of pitch and roll transformations.

In embodiments, transforming the video data comprises at least one of: when the direction of facing of the head of the user is forward and the virtual gaze direction of viewing of the external scene is sideways and the vehicle is pitching, reducing or removing roll and introducing pitch in the transformed video data based on the motion data; and when the direction of facing of the head of the user is forward and the virtual gaze direction of viewing of the external scene is sideways and the vehicle is rolling, reducing or removing pitch in the transformed video data and introducing roll based on the motion data.

In embodiments, the program instructions are configured to cause the at least one processor to: receive video data from a plurality of cameras mounted to the vehicle and stitch or fuse the video data from respective cameras together to create a surround view of the external scene.

In another aspect, a vehicle system is provided. The vehicle system includes a vehicle; at least one camera mounted to the vehicle; a video processing system; a head worn display device included in a headset; and at least one processor configured to execute program instructions. The program instructions are configured to cause the at least one processor to: receive video data from the at least one camera, the video data representing an external scene; receive motion data comprising at least one of vehicle inertial motion data from a vehicle inertial measurement unit and head position and motion data from a head position and motion tracking measurement unit mounted to the headset and vehicle; receive a virtual gaze direction of viewing of the external scene; receive a direction of facing of a head of the user; transform the video data based at least on a disparity between the virtual gaze direction and the direction of facing and based on the motion data; and displaying the transformed video data on the head worn display device of the user.

In embodiments, the vehicle is an armored vehicle.

In another aspect, a video processing system associated with a vehicle is provided. The video processing system includes one or more processors configured to execute program instructions. The program instructions are configured to cause the at least one processor to: receive video data from at least one camera mounted to the vehicle, the video data representing an external scene; receive vehicle inertial motion data from a vehicle inertial measurement unit mounted to the vehicle; receive head position and motion data from a head position and motion tracking device mounted to at least one of a headset of the user and the vehicle; transform the video data based at least on a disparity between the vehicle inertial motion data and the head position and motion data; and display the transformed video data on a display device of the user.

In embodiments, transforming the video data based at least on the disparity between the vehicle inertial motion data and the head position and motion data compensates for a differential in a Vestibular-Ocular Reflex occurring as a result of inertial motion experienced by the head of the user and movement of the external scene in the video data occurring as a result of inertial motion experienced by the vehicle.

In embodiments, the direction of facing is at least one of: predetermined information, detected by a head tracking device and determined based on the vehicle inertial motion data and head position and motion data from a head position and motion tracking device mounted to at least one of a headset of the user and the vehicle.

In embodiments, a virtual gaze direction of viewing of the external scene is selectable by a user controller.

In embodiments, transforming the video data comprises transformation, based on the motion data, to cancel or reduce a difference between expected horizon movement as a result of inertial motion experienced in the direction of facing of the head of the user and horizon movement in the video data representing the external scene as a result of the virtual gaze direction of viewing of the external scene.

In embodiments, transforming the video data includes simulating, based on the motion data, a movement of the external scene to correlate with inertial motion in the direction of facing of the head of the user.

In embodiments, transforming the video data includes at least one of pitch and roll transformations.

In embodiments, the program instructions are configured to cause the at least one processor to: receive video data from a plurality of cameras mounted to the vehicle and stitch or fuse the video data from respective cameras together to create a surround view of the external scene.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods described herein provide image stabilization and correction for nausea free viewing in an indirect vision system. The systems and methods may adjust pitch and/or roll in an external scene being viewed by a vehicle occupant to correlate the external scene with inertial motion being experienced by the user. The indirect vision system may be a 360° situational awareness system.

A lack of natural correlation between visual motion and inertial motion, sensed by the inner ear, can cause user nausea or motion sickness. In ground vehicle applications where soldiers/occupants may be facing any direction in a vehicle, while viewing an external vehicle camera image pointing in any direction at any given time on a display device such as a Head Worn Display (HWD) device, there is a high probability of uncorrelated visual motion displayed to the user and inertial motion sensed by the inner ear while the vehicle is moving, which means that there is a high probability of the user feeling nauseous if lack of correlation is not corrected. The systems and methods described herein render the image so that the visual motion of the user's display device correlates to the inertial motion of the user's inner ear at all times, regardless of the direction the user is facing, the direction they are viewing, and the vehicle and head motion.

Systems and methods described herein can enhance effectiveness of indirect vision systems for armored vehicles by providing nausea free viewing, for extended periods of time, regardless of user's disparate facing and viewing direction while the vehicle is in motion. The present systems and methods allow passengers to be actively engaged in 360° situational awareness indirect viewing reconnaissance while under armor, for enhanced survivability of vehicle and effectiveness of crew. The presently disclosed systems and methods satisfy key tenets of natural vision for a good nausea free user experience by correcting the image and stabilizing the image so that the image stays centered on the retina, preventing retina blur. This provides a nausea free high clarity viewing experience by satisfying the user's Vestibulo Ocular Response (VOR) while the vehicle is experiencing significant motion. This image stabilization system will provide good viewability and visual acuity in the presence of significant vehicle motion and turbulence. This solution provides a nausea free, natural viewing experience during extreme motion of vehicle and head, allowing extended use of operation for enhanced operational effectiveness of vehicle 360° situational awareness indirect vision systems.

In embodiments, the systems and methods provide image correction to the displayed image via an algorithm using some or all of the following inputs: facing direction of user, relative to vehicle (front, left, right, rear, anywhere in between), external camera viewing direction of user (also called a virtual gaze direction), relative to vehicle (front, left, right, rear, anywhere in between), motion of both vehicle and user's head (AZ/EL/Roll angular rates, accelerations, and differentials), system latencies (components: image display (motion to photon), vehicle and head mounted Inertial Measurement Units (IMUs)) and VOR response/time constant of user).

In embodiments disclosed herein, a video transformation algorithm generates an image correction for at least one of azimuthal, elevation and roll orientation of a Head Worn Display (HWD)image rendered based on a selected gaze position of the user. In one embodiment, a basic premise is that the user maintains a comfortable and consistent gaze position at all times, with gaze excursions caused only by vehicle turbulence and motion. The video transformation algorithm is operable in a scenario in which a user is facing forward/viewing a forward facing camera relative to a vehicle. When the vehicle and the head pitch, e.g. due to vehicle traveling over rough terrain, an HWD image elevation angle adjustment is introduced based on a difference between vehicle pitching rates/angles and head pitching rates/angles, in order to satisfy the VOR eye deflection angle/rates dictated by head pitching rates and VOR response. The net result is an image (e.g. horizon line) that stays centered on the retina and stays clearly visible throughout the vehicle pitching motion.

In a scenario in which the user is facing forward and viewing a video feed from a right facing camera relative to the vehicle, pitching of the vehicle appears as a roll change in the displayed image, and rolling of vehicle appears as a pitch change in displayed image. As vehicle and head are pitching, due to vehicle traveling over rough terrain, the HWD image is corrected to eliminate the natural roll in the right camera image due to vehicle pitching. The HWD image will pan up and down in the camera image to correlate with the VOR eye motion due to pitching motion of head relative to earth. The result will be a camera viewing experience which mimics a pseudo forward facing camera viewing experience, as far as satisfying the VOR response, and therefore results in good image clarity during vehicle motion. As the vehicle and head are rolling, due to vehicle traveling over rough terrain, the HWD image will be corrected to remove the naturally occurring pitch change in scene while rotating the displayed image to correlate with the inertially sensed rolling motion of the vehicle and head, taking into account differential signals to correlate visual and inertial motion, satisfying the VOR and maintaining good visual clarity by keeping the image centered on the retina during vehicle motion.

Figure 1:
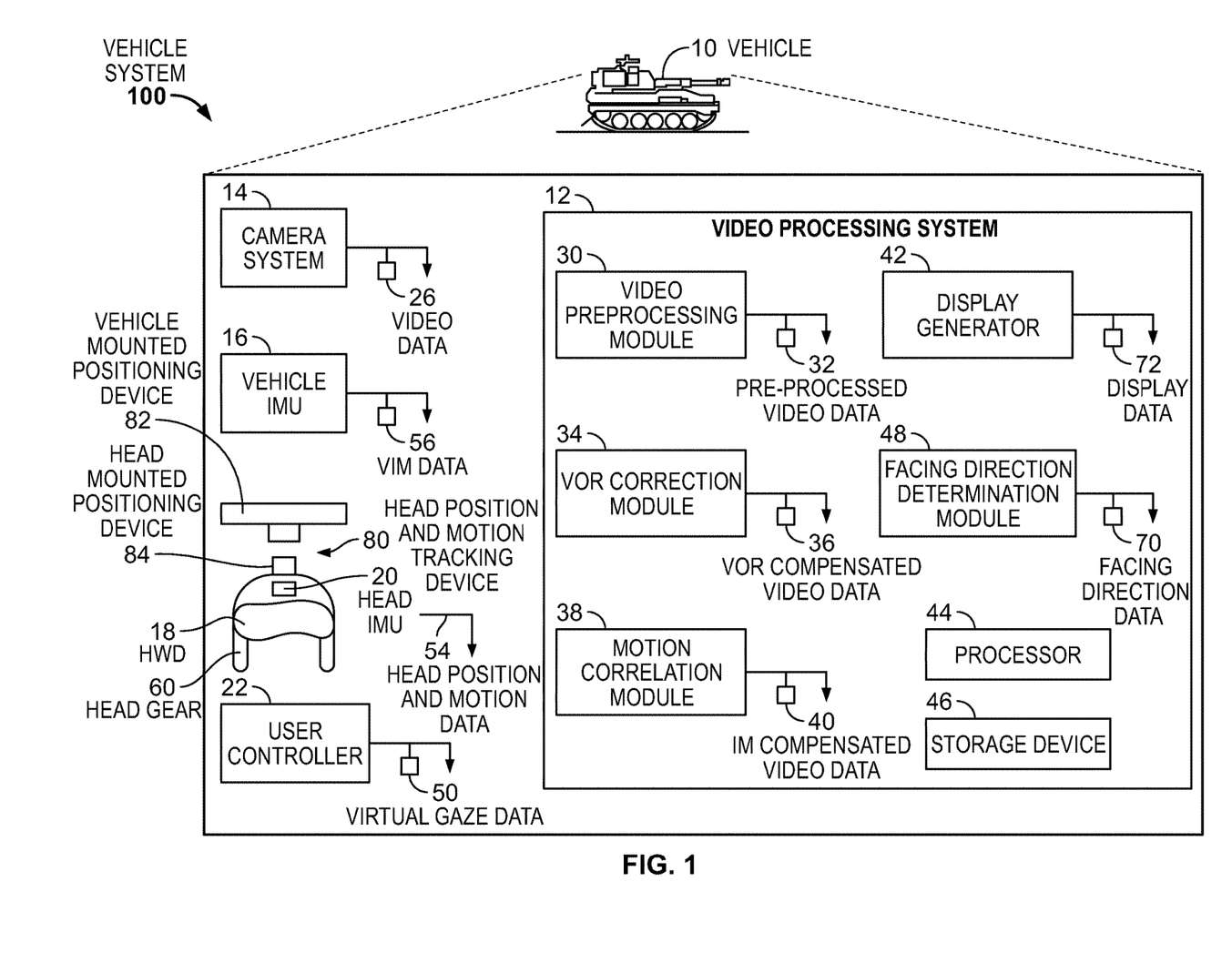
FIG. 1 is a functional block diagram illustrating a vehicle system including a video processing system, in accordance with various embodiments.

With reference to FIG. 1, a vehicle system 100 for transforming a video feed is shown. The vehicle system 100 is associated with a vehicle 10 in accordance with various embodiments. In general, the vehicle system 100 detects vehicle inertial motion and head inertial motion of an occupant and transforms a video feed for an external scene to map pitching and rolling in the video feed to that sensed by the inner ear whilst also compensating for VOR differential as a result of inertial motion at an external camera not matching that experienced by the user.

Although not shown in FIG. 1, the vehicle 10 generally includes a chassis, a body and wheels or continuous track. The body is arranged on the chassis and substantially encloses components of the vehicle. The body and the chassis jointly form a frame. The wheels or continuous track are movably coupled to the chassis. The vehicle 10 is an armored vehicle, in some embodiments. The vehicle 10 can be a land, sea or air vehicle. The vehicle 10 can also be a passenger car, truck, sport utility vehicle (SUV), recreational vehicle (RV), shared passenger vehicle, coach, etc. The vehicle 10 may be windowless. The vehicle 10 can be any type of transporter of occupants having an indirect vision system by which a video feed of an external scene is provided on display devices associated with the occupants that could result in motion sickness and blurring issues as a result of a disconnect between the inertial motion in the external scene being viewed and the inertial motion being experienced by the occupant.

Not shown in FIG. 1, the vehicle 10 generally includes a propulsion system, a transmission system, a steering system, a brake system, and an actuator system. The propulsion system may, in various embodiments, include an internal combustion engine, an electric machine such as a traction motor, and/or a fuel cell propulsion system. The transmission system is configured to transmit power from the propulsion system to the vehicle wheels or continuous track. According to various embodiments, the transmission system may include a step-ratio automatic transmission, a continuously-variable transmission, or other appropriate transmission. The actuator system includes one or more actuator devices that control one or more vehicle features such as, but not limited to, the propulsion system, the transmission system, the steering system, and the brake system.

The vehicle 10 includes a video processing system 12, a camera system 14, a vehicle Inertial Measurement Unit (IMU) 16, a Head Worn Display (HWD) 18, a head IMU 20, a user controller 22, a head position and motion tracking device 80, at least one processor 44 and a computer readable storage device or media 46. The processor 44 can be any custom made or commercially available processor, a central processing unit (CPU), a graphics processing unit (GPU), an auxiliary processor among several processors associated with the video processing system 12, a semiconductor based microprocessor (in the form of a microchip or chip set), a macroprocessor, any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 44 in performing video processing operations described herein.

The instructions may include one or more separate programs, each of which comprises an ordered listing of executable instructions for implementing logical functions. The instructions, when executed by the processor 44, receive and process signals from various inputs including the camera system 14, the vehicle IMU 16 and the head IMU 20, perform logic, calculations, methods and/or algorithms for transforming video data for display to the user. Although only one processor 44 is shown in FIG. 1, embodiments of the vehicle system 100 can include any number of processors 44 that communicate over any suitable communication medium or a combination of communication mediums and that cooperate to process the sensor signals, perform logic, calculations, methods, and/or algorithms, and generate display signals.

Figure 2:
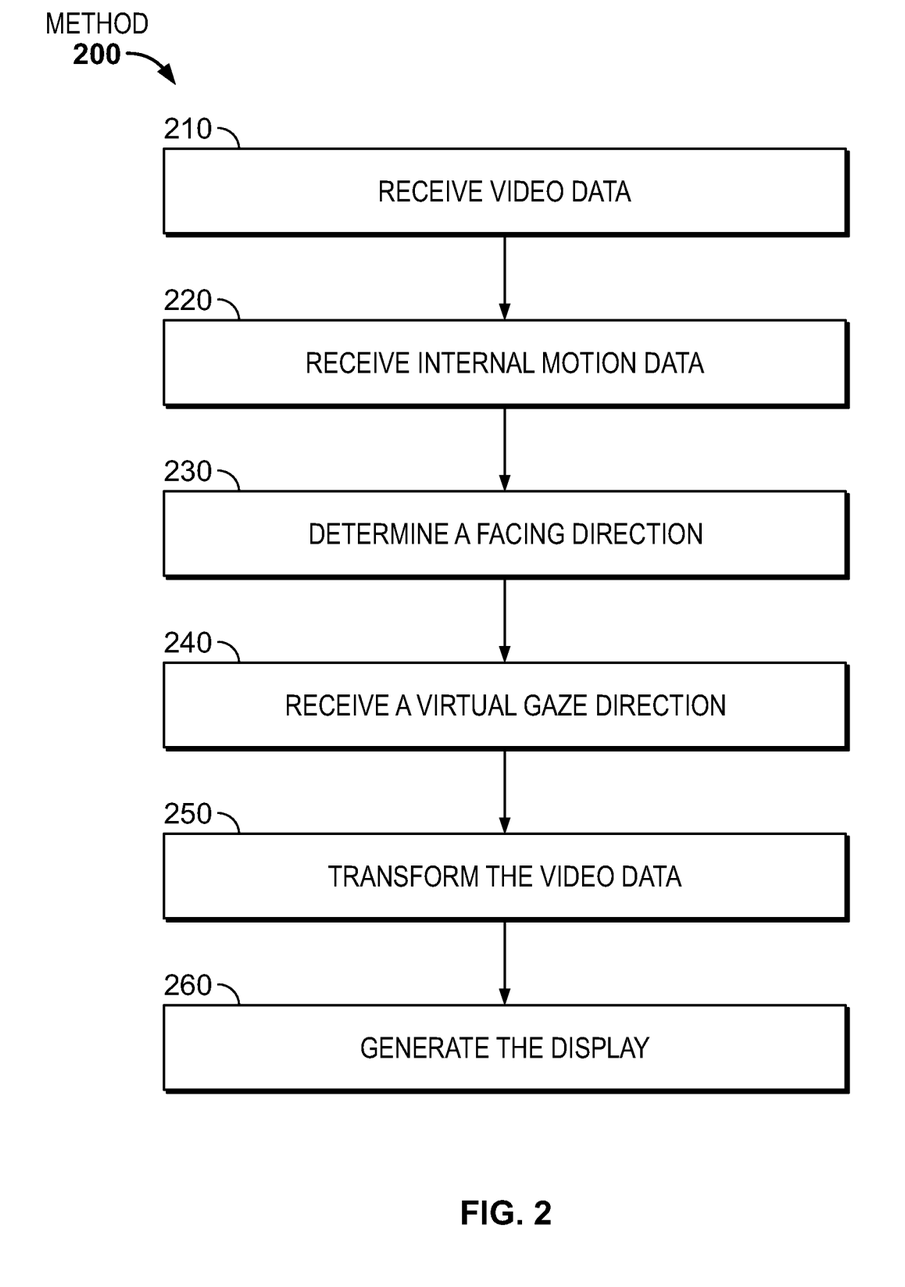
FIG. 2 is a flowchart illustrating a method of video processing, in accordance with various embodiments.

In various embodiments, one or more instructions executed by the processor 44 are embodied in the vehicle system 100 and perform the functions described with respect to the system of FIG. 1 and the steps of the method described with respect to FIG. 2. In particular, the processor 44 is configured by the instructions to receive video data 26 representing a scene external to the vehicle 10 and to receive data describing the inertial motion of the vehicle 10, position and motion of the head of an occupant, a virtual gazing direction of the occupant and an actual direction of facing of the occupant. The instructions cause the video processing system 12 to introduce rotations into the video data 26 to simulate inertial motion being experienced by the head of the occupant and to remove rotations that are seen in the video in the direction of virtual gazing but which would not be imparted to the video as a result of inertial motion experienced by the head of the occupant. Furthermore, higher frequency VOR processing can be performed to keep a rendered video centered on the retina despite lack of sensed VOR response occurring as a result of inertial motion being experienced by the user.

The camera system 14 implements an indirect vision system by which an occupant of the vehicle 10 can view, in a display device located inside the vehicle 10, video being captured from outside of the vehicle 10. The camera system 14 can include a plurality of cameras. The camera system 14 can include cameras distributed around all sides of the vehicle 10 to provide 360° surround view. A partial surround view may also be provided, such as 180° or more. The camera system 14 provides video data to the video processing system 12. The video processing system 12 includes a video pre-processing module 30 configured to stitch or fuse the video data 26 from plural cameras to provide full or partial surround view video data.

In embodiments, a user controller 22 is provided to allow user input to the video processing system 12. The user controller 22 may allow a user to select a direction of virtual gazing of the user. The user controller 22 can include a wheel or other hand operated controller allowing an angle of virtual gazing to be selected. The selected angle or position of virtual viewing of the video of the external scene is sent to the video processing system 12 as part of virtual gaze data 50. The video pre-processing module 30 selects and extracts part of the surround video data based on the selected angle or position included in the virtual gaze data 50. For example, a vehicle occupant facing forwards in the vehicle 10 may opt, using the user controller 22, to view video of an external scene to the right of the vehicle 10 without moving their head. In this scenario, the virtual gazing direction is to the right of the vehicle whereas the direction of facing is forwards. The vehicle occupant can adjust the video being viewed in a variety of virtual gazing directions including azimuth and elevation angles relative to a central vertical axis of the vehicle 10 (or the camera system 14). The video pre-processing module 30 selects a corresponding part of the surround video data on that basis and outputs pre-processed video data 32 cropped to the selected portion.

When the direction of facing and the virtual gazing direction do not match, the video of the external scene has motions included therein that are not expected according to the sensory information being provided by the inner ear. This can cause motion sickness. It can also cause video blurring because the VOR response is not aligned with the motion in the video. The present disclosure provides a video processing system 12 that alleviates or overcomes these issues.

The video processing system 12 includes a facing direction determination module 48 configured to determine an actual facing direction of an occupant of the vehicle 10. The actual/physical facing direction can be determined in a number of possible ways. In one embodiment, the actual facing direction is assumed from predetermined knowledge. In vehicles having forward facing seats, a nominal facing direction that is aligned with a forward moving direction of the vehicle 10 is assumed. In vehicles having side facing seats, a nominal side (left or right) facing direction is assumed. In another embodiment, the physical facing direction could be input via the user controller 22. In other embodiments, a head position and motion tracking device 80 is included in the vehicle 10. Such a head position and motion tracking device 80 can include one or more transmitters/sensors on headgear 60 worn by the occupant and one or more cooperating transmitters/sensors included in the vehicle 10. An orientation of the head of the occupant can be determined based on signals from such sensors. For example, cooperating ultrasonic transmitters and receivers can be used. The head position and motion tracking device 80 could also be implemented as an optical camera mounted in the vehicle 10 and tracking the head of the vehicle occupant. Different implementations of the head position and motion tracking device 80 are described further below. The head position and motion tracking device 80 provides outputs from its sensors to the facing direction determination module 48 in the form of head position and motion data 54head position and motion data 54head position and motion data 54. In other embodiments, a head IMU 20 could be included in the headgear. By comparing inertial motion sensed by the head IMU 20 and the inertial motion sensed by a vehicle IMU 16, a relative orientation of the head can be derived. The angle of the head in a frame of reference of the vehicle 10 can be provided in an angular system such as in azimuth and elevation coordinates. The facing direction determination module 48 thus outputs facing direction data 70 representing an angular orientation of the head of a vehicle occupant. The angular orientation can be simplified in some embodiments to one of a discrete set of angles such as forward, left, right and rear relative to the forward movement of the vehicle 10 or even less orientations if any of these possibilities are not applicable for a particular configuration of the seating of the vehicle 10. However, a greater degree of discretization of the angular orientation of the head will provide more accurate video correction techniques as outlined further herein.

The vehicle system 100 includes a vehicle IMU 16 and a head IMU 20. In some embodiments, the head IMU 20 is included as part of the head position and motion tracking device 80 described further below. An IMU is an electronic device that measures and reports specific force, angular rate, and sometimes the orientation of the vehicle or head using a combination of accelerometers, gyroscopes, and optionally magnetometers. The vehicle IMU 16 provides signals of yaw, pitch and roll rate and longitudinal, lateral and vertical acceleration of the vehicle 10 in the form of Vehicle Inertial Motion (VIM) data 56. The head IMU 20 provides signals of yaw, pitch and roll rate and longitudinal, lateral and vertical acceleration of the head of an occupant in the form of Head Inertial Motion (HIM) data 54. Each occupant may wear headgear 60 including a head IMU 20. In other embodiments, inertial motion of the head can be derived from tracking the position and motion of the head using the head position and motion tracking device 80.

In another exemplary embodiment, the head position and motion tracking device 80 is used to determine the head motion, specifically the head position and motion data 54. That is, by accurately tracking motion of the head (which is representative of inertial motion of the head) without (or as a supplement to) the head IMU 20. In one example a hybrid optical/inertial head tracker is used, but other exemplary embodiment include pure optical or magnetic, or magnetic/inertial or other hybrid inertial solutions.

For example, the head position and motion tracking device 80 includes two components that work together. A first component is a head mounted positioning device 84 attached to the HWD 18, which may include an inertial measurement unit as well as a positioning device (e.g. optical or magnetic or other position tracking device). A second component is a vehicle mounted positioning device 82 mounted on the vehicle 10 and includes the other complementary part of the positioning device (e.g. optical, magnetic or other) and may also include an inertial measurement unit to detect motion of the vehicle 10. If a separate IMU is located elsewhere in the vehicle 10, such as an inertial reference unit, this sensor can be used for sensing the vehicle motion (and thus providing the VIM data 56) and an IMU is not needed in the vehicle mounted portion of the head position and motion tracking device 80.

The motion correlation module 38 of the video processing system 12 receives the head position and motion data 54 for an occupant and the VIM data 56 for the vehicle 56, the facing direction data 70 and the virtual gaze data 50. The motion correlation module 38 simulates, in the pre-processed video data 32, inertial motion effects experienced along the actual facing direction according to the head position and motion data 54 and removes inertial motion effects in the pre-processed video data 32 that would not be experienced along the actual facing direction according to the VIM data 56. In some embodiments, an approximation can be made that the inertial motion detected by the head IMU 20 (or the motion of the head detected by the head position and motion tracking device 80) is the same as that detected by the vehicle IMU 16 such that only one of the VIM data 56 and the head position and motion data 54 is used by the motion correlation module 38. The motion correlation module 38 may introduce and remove roll and pitch effects in some embodiments. In one embodiment, the sensed inertial motion along the actual facing direction, as provided by the head position and motion data 54 or the VIM data 56 when the actual direction of facing is in line with the vehicle heading direction, is projected along the virtual gazing direction. In this way, motion components of roll and pitch along the virtual gazing direction can be removed from the pre-processed video data 32. Further, components of roll and pitch along the actual facing direction, per the VIM data 56 or the head position and motion data 54, can be simulated in the pre-processed video data 32. In some embodiments, these processes can be combined by adjusting the pre-processed video data 32 according to the disparity between roll and pitch components of inertial motion along the virtual gazing direction as compared to the actual facing direction. In this way, the motion correlation module 38 maps motion seen in the pre-processed video data 32 along the virtual gazing direction to motion that would have been seen according to inertial motion experienced by the head of the vehicle occupant. Thus, pitching and rolling of a horizon that would be seen along the actual facing direction is simulated in the pre-processed video data 32. Put another way, the angular disparity between the actual facing direction and the virtual gazing direction and the head position and motion data 54 or the VIM data 56 is used to determine a transformation function that is applied to the pre-processed video data 32 to rotate inertial motion effects seen in the pre-processed video data 32 along the virtual gazing direction to align with inertial motion effects that would be in the pre-processed video data 32 along the actual facing direction. The transformation function may be limited to pitch and roll transformations. The motion correlation module 38 is thus able to simulate inertial motion effects in the pre-processed video data 32 that are being experienced by the head of the vehicle occupant irrespective of a disparity between the virtual gazing direction and actual facing direction, thereby reducing probability of motion sickness of the occupant. The motion correlation module 38 outputs IM compensated video data 40 embodying video data that has been transformed by the motion correlation module 38 as described above.

In one use case scenario, the facing direction is forward and the virtual gazing direction is to the right. In such an example, pitching of the vehicle 10 appears as a roll motion in the video feed. The motion correlation module 38 determines a disparity of 90° between the facing direction and the virtual gazing direction and the head IMU 20 (or the head position and motion tracking device 80) or the vehicle IMU 16 outputs a magnitude of pitch that is non-zero and a magnitude of rolling that is, in this example, zero along the facing direction. Based on the angular disparity, the motion correlation module 38 determines that rolling motion in the pre-processed video data 32 should be removed according to the magnitude of pitch and pitching motion in the pre-processed video data 32 should be introduced according to the magnitude of pitch. In scenarios when the facing direction and the virtual gazing direction are at non-perpendicular angles, there will be non-zero rolling and pitching components in the head position and motion data 54 or the VIM data 56 along the facing direction, which will require the corresponding pitching and rolling components along the virtual gazing direction to be removed and the detected pitching and rolling components in the facing direction to be simulated. In an example where the vehicle 10 is only rolling and the occupant of the vehicle is facing forward and has a virtual gazing direction to the right, the pre-processed video data 32 is adjusted to remove pitching motion according to a detected magnitude of rolling in the virtual gazing direction and to introduce rolling motion in the pre-processed video data 32 in the facing direction according to the detected magnitude of rolling.

The video processing system 12 includes a VOR correction module 34 that aims to correct for a VOR response of the occupant that does not match a VOR response required to keep a displayed image stable on the center of the retina. The VOR is a reflex acting to stabilize gaze during head movement, with eye movement due to activation of the vestibular system. The reflex acts to stabilize images on the retinas of the eye during head movement by producing eye movements in the direction opposite to head movement. However, when inertial motion being experienced by the part of the camera system 14 providing the video feed does not match that being experienced by the head of the occupant, the VOR may not serve its purpose. Accordingly, the VOR correction module 34 determines a disparity in magnitude and direction between the inertial motion experienced by the head of the user according to the head position and motion data 54 (which may be detected by the head IMU 20 or the heading position and motion tracking device 80 or a combination thereof) and the inertial motion experienced by the vehicle 10, optionally at the location of the camera capturing the external scene according to the virtual gazing direction, which can be derived from the VIM data 56. The VOR correction module 34 may be limited to pitching adjustments to the pre-processed video data 32 or may make rolling adjustments as well. The VOR correction module 34 introduces inertial motion effects to the pre-processed video data 32 to keep the image rendered on the display centered on the retina, taking into account knowledge of the VOR of the occupant that will occur as a result of inertial motion being experienced by the head of the occupant. In one example where the facing direction of the user is forward and the virtual gazing direction is also forward, the VIM data 56 may indicate pitching of n° and the head position and motion data 54 may indicate pitching of the head of the user of m° because of an offset between a camera and the location of the user. Based on the angular disparity (n–m), the VOR correction module 34 introduces pitching to the pre-processed video data 32 to compensate for a VOR response of the user that will not match that required according to the amount of pitching motion in the pre-processed video data 32. It should be appreciated that the VOR correction module 34 and the motion correlation module 38 may operate independently and achieve effects of video stabilization and motion sickness alleviation and may also operate in tandem as shown in FIG. 1. The functions of the VOR correction module 34 and the motion correlation module 38 can be combined into a single module. Thus, the simulation constructed by the motion correlation module 38 may additionally factor-in a disparity between the detected head and vehicle inertial motion so that pitching and/or rolling that are being simulated based on inertial motion being experienced by the user is stabilized on the retina because it takes into account VOR of the eyes of the user. The VOR correction module 34 outputs VOR compensated video data 36 that has been transformed by the VOR correction module 34 as described above.

The display generator 42 receives the VOR compensated video data 36 and the IM compensated video data 40 and combines them to generate display data 72. In other embodiments, the pre-processed video data 32 passes through the VOR correction module 34 and the motion correlation module 38 in sequence, in either order, which is then sent to the display generator 42 for final rendering. In other embodiments, the VOR correction module 34 and the motion correlation module 38 are combined processes and the resulting transformed video data is used by the display generator 42 for final rendering. The display generator 42 functions to render a display on a display device of the vehicle system 100 that has been compensated for inertial motion mismatch with the inner ear and VOR mismatch as described herein. The display generator 42 generates the display to correspond with the virtual gazing direction as selected by the user according to the virtual gaze data 50. The display device, which is the HWD 18, in this present embodiment, provides a user display to the occupant based on the display data 72 from the display generator 42. The display device does not need to be a HWD. In other embodiments, a vehicle mounted display (e.g. a seat back display) or a personal display device (e.g. smart phone, tablet, laptop) can be used, since such display devices are also known to cause motion sickness and can appear blurred due to VOR mismatch.

Although the present disclosure has been described primarily in the context of pitch and roll compensation, it should be appreciated that similar principles can be applied to introduce yaw compensation. Yaw compensation may be appropriate for different vehicle platforms such as air, sea and land.

Referring now to FIG. 2, and with continued reference to FIG. 1, a flowchart illustrates method 200 that can be performed by the vehicle system 100 for transforming video data to reduce motion sickness and to stabilize images on the retina in indirect vision systems, in accordance with the present disclosure. As can be appreciated in light of the disclosure, the order of operation within the method is not limited to the sequential execution as illustrated in FIG. 2, but may be performed in one or more varying orders as applicable and in accordance with the present disclosure.

In step 210, video data 26 is received by the video processing system 12 from the camera system 14. The video data 26 includes a 360° surround view of a scene external to the vehicle 10 in some embodiments. In step 220, head position and motion data 54 and/or VIM data 56 (collectively referred to as motion data) is received representing inertial motion experienced by the vehicle 10 and/or motion of the head of a vehicle occupant. The head position and motion data 54 may be detected or derived from the head IMU 20 or the head position an tracking device 80 or a combination thereof, which are at least partly mounted to the HWD 18. In embodiments, both head position and motion data 54 and VIM data 56 is received representing inertial motion experienced by the head of the occupant and by the vehicle 10. In step 230, a facing direction of the vehicle occupant is received, which represents a physical facing direction of the vehicle occupant. The facing direction may be determined in a variety of methods including through analysis of the VIM data 56 and the head position and motion data54, through a head position and motion tracking device 80 or by using a predetermined assumption. In step 240, a virtual gaze direction is received. The virtual gaze direction represents a user selection of a part of the external scene to be viewed. The video processing system 12 selects part of the video data 26 representing the selected part of the external scene for further processing. The virtual gaze direction can be an azimuthal angular direction (and optionally also elevation angular direction) relative to the vehicle 10.

In step 250, the selected portion of the video data according to the virtual gaze direction is transformed so as to compensate for a disparity between the facing direction and the virtual gaze direction, which may cause motion sickness because the inner ear of the occupant is experiencing different inertial motion in the facing direction than inertial motion effects being seen in the virtual gazing direction. The magnitude and direction of the transformation is calculated based on the angular disparity between the facing and virtual gazing directions and based on the sensed inertial motion (magnitude and direction), which can be taken from the head position and motion data 54 or derived from the VIM data 56. The video processing system 12 maps the detected inertial motion experienced by the vehicle occupant to motion effects in the video so as to simulate inertial motion effects in the (pre-processed) video data 32 in the virtual gazing direction that match the inertial motion effects in the facing direction and to remove inertial motion effects in the (pre-processed) video data 32 in the virtual gazing direction that do not match the inertial motion effects in the facing direction at least along pitch and roll axes. Furthermore, the video processing system 12 applies a VOR correction function that introduces pitch (and optionally also roll) transformations that are configured to maintain a display of the video data on a center of the retina by compensating for a difference in expected VOR response as a result of the inertial motion experienced by the head of the user and expected VOR response considering the inertial motion experienced at the camera of the camera system 14. Accordingly, the VOR correction function simulates at least pitch (and optionally also roll and yaw) transformations based on a disparity between the vehicle inertial motion (which may be limited to a pitch component) in the virtual gazing direction and the head inertial motion (which may be limited to a pitch component) in the facing direction and knowledge of a relationship between VOR response and inertial motion.

In step 260, the transformed video data from step 250 is provided to a display device, such as the HWD 18, for viewing by a vehicle occupant.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A video processing system associated with a vehicle, the video processing system comprising:
   at least one processor configured to execute program instructions, wherein the program instructions are configured to cause the at least one processor to:
   receive video data from at least one camera mounted to the vehicle, the video data representing an external scene in a virtual gazing direction including external scene vehicle motion data;
   receive vehicle motion data comprising vehicle inertial motion data from a vehicle inertial measurement unit;
   receive head motion data associated with a direction of facing of a head of a user from a head motion tracking device;
   receive the virtual gaze direction associated with the external scene;
   determine the external scene vehicle motion data with respect to the virtual gazing direction based on the vehicle inertial motion data;
   transform the video data representing the external scene in the virtual gazing direction by removing the external scene vehicle motion data and introducing the head motion data to generate transformed video data; and
   display the transformed video data on a display device of the user.

2. The video processing system of claim 1, wherein the program instructions are configured to cause the at least one processor to: receive the head motion data from the head motion tracking device mounted to at least one of a headset of the user and the vehicle, and wherein the video data is transformed additionally based at least on a disparity between the vehicle inertial motion data and the head motion data.

3. The video processing system of claim 1, wherein the direction of facing is at least one of: predetermined information; detected by a head position tracking device; and determined based on the vehicle inertial motion data and the head motion data from the head motion tracking device mounted to a headset of the user.

4. The video processing system of claim 1, wherein the virtual gaze direction of viewing of the external scene is selectable by a user controller.

5. The video processing system of claim 1, wherein transforming the video data comprises transformation, based on the motion data, to cancel or reduce a difference between expected horizon movement as a result of inertial motion experienced in the direction of facing of the head of the user and horizon movement in the video data representing the external scene as a result of the virtual gaze direction of viewing of the external scene.

6. The video processing system of claim 1, wherein transforming the video data includes simulating, based on the motion data, a movement of the external scene to correlate with inertial motion in the direction of facing of the head of the user.

7. The video processing system of claim 1, wherein transforming the video data includes at least one of pitch, roll and yaw transformations.

8. The video processing system of claim 1, wherein transforming the video data includes at least one of pitch and roll transformations.

9. The video processing system of claim 1, wherein transforming the video data comprises at least one of:
   when the direction of facing of the head of the user is forward and the virtual gaze direction of viewing of the external scene is sideways and the vehicle is pitching, reducing or removing roll and introducing pitch in the transformed video data based on the inertial motion data; and
   when the direction of facing of the head of the user is forward and the virtual gaze direction of viewing of the external scene is sideways and the vehicle is rolling, reducing or removing pitch in the transformed video data and introducing roll based on the inertial motion data.

10. The video processing system of claim 1, wherein the program instructions are configured to cause the at least one processor to: receive video data from a plurality of cameras mounted to the vehicle and stitch or fuse the video data from respective cameras together to create a surround view of the external scene.

11. A vehicle system comprising:
   a vehicle;
   at least one camera mounted to the vehicle;
   a head worn display device included in a headset; and
   a video processing system in operable communication with the at least one camera and the head worn display device, the video processing system comprising at least one processor configured to execute program instructions, wherein the program instructions are configured to cause the at least one processor to:

receive video data from the at least one camera, the video data representing an external scene in a virtual gazing direction including external scene vehicle motion data;

receive vehicle motion data comprising vehicle inertial motion data from a vehicle inertial measurement unit;

receive head motion data associated with a direction of facing of a head of a user from a head motion tracking device mounted to at least one of the headset and the vehicle;

receive the virtual gaze direction associated with the external scene;

determine the external scene vehicle motion data with respect to the virtual gazing direction based on the vehicle inertial motion data;

transform the video data representing the external scene in the virtual gazing direction by removing the external scene vehicle motion data and introducing the head motion data to generate transformed video data; and display the transformed video data on the head worn display device of the user.

12. The vehicle system of claim 11, wherein the vehicle is an armored vehicle.

13. A video processing system associated with a vehicle, the video processing system comprising:

at least one processor configured to execute program instructions, wherein the program instructions are configured to cause the at least one processor to:

receive video data from at least one camera mounted to the vehicle, the video data representing an external scene in a virtual gazing direction including external scene vehicle motion data;

receive vehicle inertial motion data from a vehicle inertial measurement unit mounted to the vehicle;

receive head motion data associated with a direction of facing of a head of a user from a head motion tracking device mounted to at least one of a headset of the user and the vehicle;

determine the external scene vehicle motion data with respect to the virtual gazing direction based on the vehicle inertial motion data;

transform the video data representing the external scene in the virtual gazing direction by removing the external scene vehicle motion data and introducing the head motion data to generate transformed video data; and display the transformed video data on a display device of the user.

14. The video processing system of claim 13, wherein transforming the video data based at least on the disparity between the vehicle inertial motion data and the head motion data compensates for a differential in a Vestibular-Ocular Reflex occurring as a result of inertial motion experienced by the head of the user and movement of the external scene in the video data occurring as a result of inertial motion experienced by the vehicle.

15. The video processing system of claim 13, wherein the direction of facing is at least one of: predetermined information; detected by a head position tracking device; and determined based on the vehicle inertial motion data and the head motion data from the head motion tracking device mounted to at least one of a headset of the user and the vehicle.

16. The video processing system of claim 13, wherein a virtual gaze direction of viewing of the external scene is selectable by a user controller.

17. The video processing system of claim 13, wherein transforming the video data comprises transformation, based on the motion data, to cancel or reduce a difference between expected horizon movement as a result of inertial motion experienced in the direction of facing of the head of the user and horizon movement in the video data representing the external scene as a result of the virtual gaze direction of viewing of the external scene.

18. The video processing system of claim 13, wherein transforming the video data includes simulating, based on the motion data, a movement of the external scene to correlate with inertial motion in the direction of facing of the head of the user.

19. The video processing system of claim 13, wherein transforming the video data includes at least one of pitch and roll transformations.

20. The video processing system of claim 13, wherein the program instructions are configured to cause the at least one processor to: receive video data from a plurality of cameras mounted to the vehicle and stitch or fuse the video data from respective cameras together to create a surround view of the external scene.

* * * * *